United States Patent [19]

Zurawski et al.

[11] Patent Number: 4,922,446

[45] Date of Patent: May 1, 1990

[54] APPARATUS AND METHOD FOR FLOATING POINT NORMALIZATION PREDICTION

[75] Inventors: John H. Zurawski, Stow; Kathleen P. Harrington, Groton, both of Mass.

[73] Assignee: Digital Equipment Corporation, Maynard, Mass.

[21] Appl. No.: 176,612

[22] Filed: Apr. 1, 1988

[51] Int. Cl.⁵ .................................................. G06F 7/50
[52] U.S. Cl. ........................................ 364/748; 364/715.04
[58] Field of Search ................................ 364/748, 715.04

[56] References Cited

U.S. PATENT DOCUMENTS 4,758,974 7/1988 Fields et al. ........................ 364/748
4,779,220 10/1988 Nukiyama ........................... 364/748

OTHER PUBLICATIONS

"Pipeline Control in Pre-Norm Logic", *IBM Tech. Disclosure Bulletin,* vol. 30, No. 1, Jun. 1987, pp. 79–86.

*Primary Examiner*—David H. Malzahn
*Attorney, Agent, or Firm*—Kenyon & Kenyon

[57] ABSTRACT

The invention is directed to an apparatus and method for predicting the number of bits which must be taken into account to normalize the result of a floating point addition or subtraction. The apparatus and method employ: a low precision floating point adder/subtractor, a priority encoder that determines the position of the most significant non-zero bit to generate the normalization amount and preround logic which pre-shifts a rounding bit in the opposite direction of normalization. The method and apparatus operate in parallel with a full precision floating point adder to eliminate the need for a full-precision floating point normalization calculation and rounding computation in most circumstances. The normalization amount for successful low-precision floating-point addition/subtraction is calculated by the time the full-precision floating-point addition/subtraction stage occurs. Moreover, the pre-round logic supplies a carry bit to the full-precision adder/subtractor thus saving the time associated with a full-precision rounding bit addition. Thus, this low-precision floating-point addition/subtraction technique results in a significant enhancement of performance in floating-point addition/subtraction.

11 Claims, 3 Drawing Sheets

APPARATUS AND METHOD FOR FLOATING POINT NORMALIZATION PREDICTION

FIELD OF THE INVENTION

This invention relates to the performance and hardware associated with arithmetic operations. More specifically, it relates to the hardware and operation of floating-point addition and subtraction.

BACKGROUND OF INVENTION

Floating-point arithmetic operations are well-known. The benefit of such operations is derived from the manner in which the floating-point number is represented by two registers, one to store the fixed-point number itself, the mantissa, and the other to store the exponent of that number. The advantage of such representation is that it increases the range of numbers which a register can accommodate.

In floating-point addition/subtraction, unlike multiplication or division, the exponents of the two numbers must be equal before the operation can be performed. Consequently, the exponents of the two numbers to be added or subtracted must be compared. The difference between the two exponents then represents the amount to which one exponent will have to be increased and the amount to which the mantissa associated with that exponent will have to be shifted in order to compensate for the increased value of the exponent.

A brief example will easily explain this operation. Assume the subtraction of 0.1101 from 1.010. The floating point representation for these numbers is $0.1101 \times 2^0$ and $0.1010 \times 2^1$, respectively, wherein the 2 represents the base of the exponent, indicating that the numbers are represented as binary numbers. The subtraction of the exponents of these numbers indicates that the smaller exponent, associated with mantissa 0.1101, will have to be increased by one, and consequently the mantissa of that exponent will have to be shifted to the right by one, to compensate for the increase in the exponent. Consequently, the new floating point representation for $0.1101 \times 2^0$ is $0.01101 \times 2^1$. With the exponents now equal, the mantissas can be added or subtracted, depending upon the applicable function to be performed.

Floating-point numbers are generally stored in registers as normalized numbers. This means that the most significant bit of the mantissa has a non-zero value. Employing this method allows the most accurate value of a number to be stored in a register and allows a wide range of numbers to be represented since the value of the exponent of the floating-point number will compensate for any "padded" zeros required at the most significant bit locations of the number.

In view of the fact that floating-point numbers are stored as normalized numbers, after the addition or subtraction occurs, before the result can be stored, it must be normalized. This occurs by calculating the first left-most bit place in which a non-zero value appears. This value will indicate the number of bits the number will have to be shifted to the left, so that the most significant bit of the number has a non-zero value. This number also indicates the value to which the exponent must be decreased to compensate for the leftward shifts of the mantissa.

In the systems of the prior art, after the number has been normalized a one must be added to the least significant bit minus one location (LSB-1), known as adding a round bit, to approximate the true value of the LSB. For example, if the LSB-1 is one (1), adding a one to that location will result in carry into the LSB thus giving a better approximation for the true result. In the systems of the prior art, the one, known as the round bit, is added after the number is normalized. The problem with such a technique is that to add a one to the LSB-1 of the result, after normalization, requires a full addition process. When the addition or subtraction involves higher-order numbers such as 64-bits, a full addition stage for the addition of a one to the LSB-1 is very time consuming and slow. Such a time delay will result in a delay in sending the result of this floating-point arithmetic operation to the other elements in the processing system, and consequently can delay the execution of the next set of operations to be performed. With the increased speed upon which current computers operate, unnecessary delays can be crucial to the operations of the system.

Additionally, with current floating-point systems, there is often an additional delay associated with informing other elements of the central processor when the floating-point addition/subtraction is completed. This idle time is critical in the high technology computers being developed today which operate at such rapid speeds.

Therefore, there is currently a need in the rapidly developing computer industry to overcome these shortcomings and enable floating-point additions and subtractions to occur more rapidly and with the same degree of accuracy.

The prior art has attempted to overcome these problems by predicting the normalization amount early based on the amount the floating-point number is aligned. This theory is based on the fact that usually very large alignments result in small normalization shifts. However, the success of this approach is limited to the infrequent cases of large alignment and is useless for the case of small or no alignment shift. In addition, the prior art relies on normalized input operands to function correctly.

SUMMARY OF INVENTION:

One object of this invention is therefore to predict, at an early stage, the normalization amount, and be able to accurately add a one to LSB-1 location of the result of the addition or subtraction of the two floating-point numbers at the same stage as the full addition or subtraction is occurring to prevent an additional addition after normalization.

A further object of this invention is to overcome the problems presented with idle delays by informing the next processing element in advance when the floating-point operation will be complete.

The present invention is directed towards an apparatus and method for determining the normalization amount for the result of an addition or subtraction prior to the full addition or subtraction of all the bits of the floating-point numbers. The invention achieves this by performing a complete floating point addition or subtraction on only a preselected number of most significant bits (MSB), for example eight, of each of the two numbers to be added or subtracted to provide an approximation of the true result sufficient enough to approximate the normalization shift amount. With this normalization amount known at an early stage, the one, which is to be added to the LSB-1 location, can be pre-normalized and added during the addition/subtraction stage of the full adder instead of at some time after the addition or subtraction is complete. Overcoming the full second addition stage after normalization provides for performance enhancement with the same degree of accuracy.

DETAILED DESCRIPTION

Figure 1:
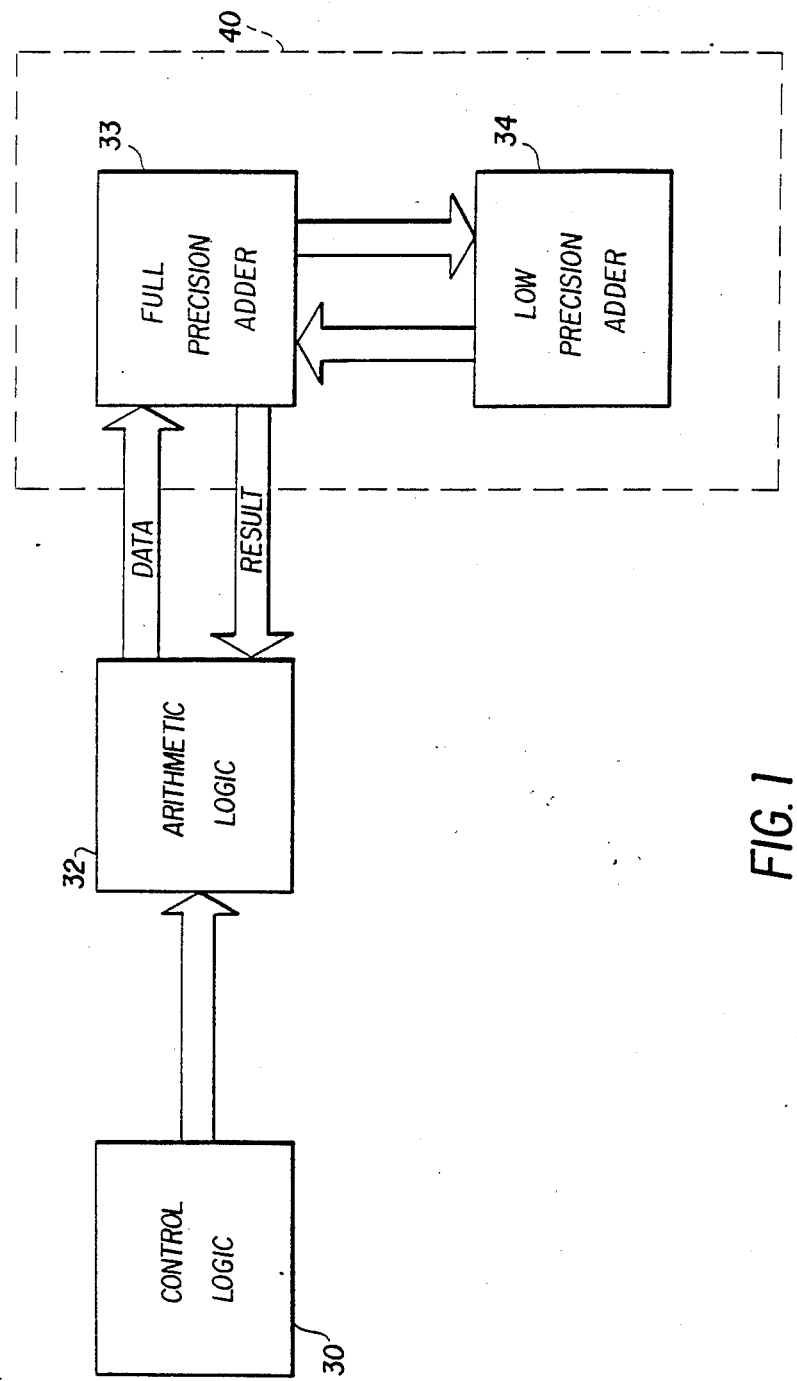
FIG. 1 is a block diagram of the present invention.

Referring to FIG. 1, a basic usage of the invention is disclosed. A central processing unit 30 sends an instruction to an arithmetic unit 32, requesting the addition or subtraction of two floating-point numbers. The data to be added or subtracted is then transmitted by the arithmetic unit 32 to a floating-point apparatus 40.

Within the floating-point apparatus 40 there is both a full precision adder 33 and a low precision adder 34. The low precision adder 34 only performs an addition or subtraction on a number of most significant bits (MSB), for example eight, of each of the numbers to be added or subtracted. This enables an approximation to the result of the full addition or subtraction which can be used to calculate the normalization amount in sufficient time, so that a one can be added to the LSB-1 location of the 64-bit result prior to normalization.

Figure 2:
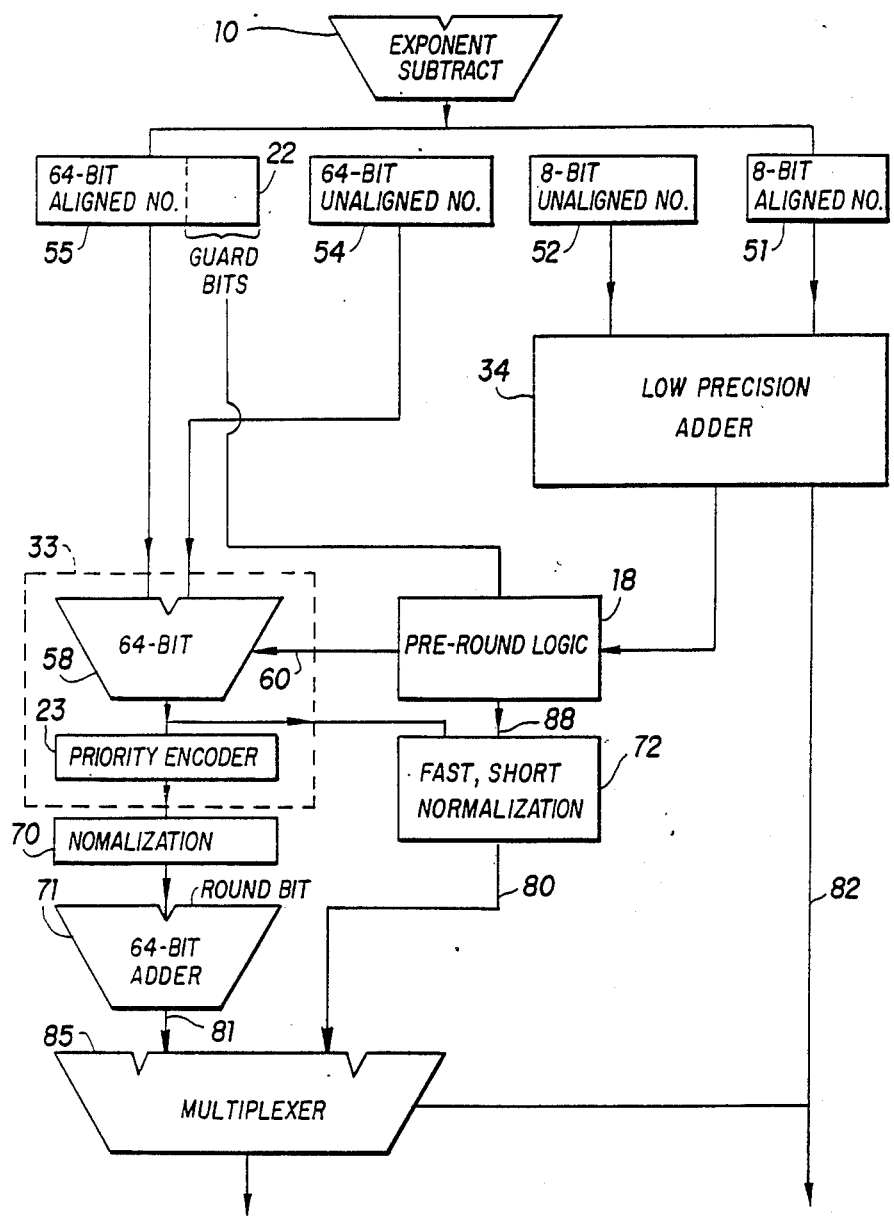
FIG. 2 is a block diagram of the full and low precision adders of the invention.

Referring to FIG. 2, the low precision adder 34 is coupled in parallel with the full precision adder 33 of the prior art. Before either operation, an exponent subtract 10 compares the exponents of the two floating point numbers. As in conventional systems, the difference between the two exponents represents the amount to which the mantissa associated with the smaller exponent will have to be aligned and the exponent incremented so the exponents of the two numbers are equal prior to the arithmetic operation.

Figure 3:
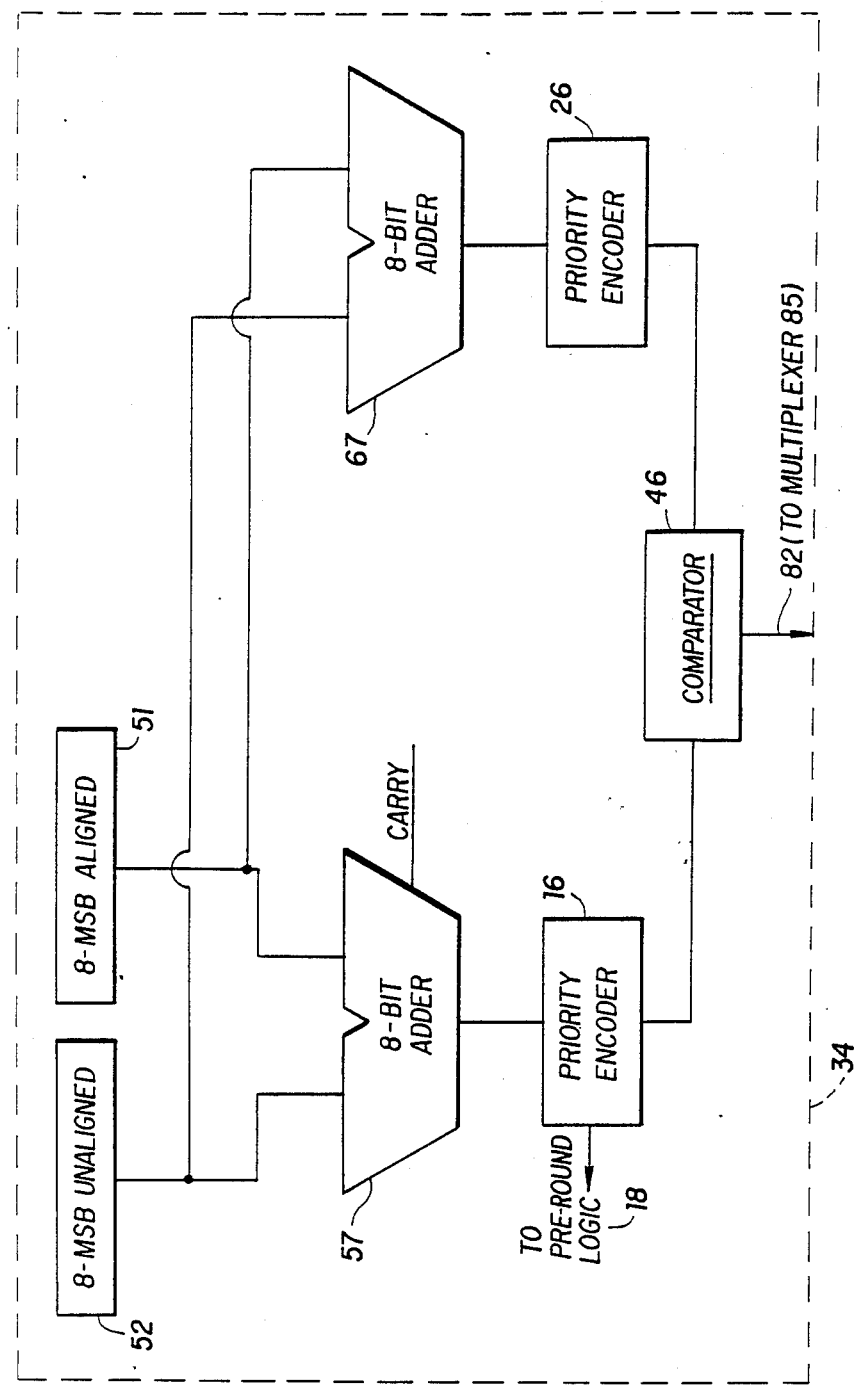
FIG. 3 is a more detailed block diagram of the low precision adder.

Referring to FIG. 3, the basic elements the low precision adder 34 are disclosed: two 8-bit registers 52, 51, two 8-bit addition or subtraction apparati 57, 67, two priority encoders 16, 26 and a comparator 46.

The low-precision adder 34 only operates with the eight most significant bits of the two floating-point numbers to be added. Consequently, prior to the alignment of the 64-bit mantissa associated with the smaller exponent, the eight MSB of that number are transferred to a register 51 and the eight most significant bits of the unaligned 64-bit number are transferred to a register 52 to be used by the 8-bit adders 57, 58. This enables the alignment of the eight most significant bits of the 64-bit addend independent of the full 64-bit alignment so that the low precision adder 34 can begin operating before the full 64-bit alignment is completed.

The result of the exponent comparison FIG. 2, 10 is then used to align the eight most significant bits of the 64-bit addend in a register 51, in addition to aligning the 64-bit addend 55, which will be used by the 64-bit adder 58.

The lower-order bits, guard bits 22, which are shifted out of the least significant bit locations of the 64-bit aligned number are saved and used by a pre-round logic 18 at a later point to determine if there will be a carry-in 60 to the add/sub stage 58 of the full adder 33.

While the 64-bit mantissa is being aligned, the low precision adder 34 is performing an addition/subtraction on the 8-MSB of the two addends 52, 51 to be operated upon.

Since a calculation of the normalization amount based on the result of an 8-MSB addition can be incorrect because a carry from the low order bits may be missing, the invention provides for two low precision adders to work simultaneously. FIG. 3.

One 8-bit adder 57 of the low precision adder 34 receives a carry during the add/sub stage 57 and the other 8-bit adder 67 does not. Upon completion of the addition/subtraction, priority encoders 16, 26, associated with the two separate 8-bit adders 57, 67, respectively, then separately calculate the normalization amount for each result. The results are then compared in the comparator 46. If the normalization amount is the same for both results of the 8-bit additions 57, 67 then the normalization amount is correct and that normalization amount is then transmitted to a pre-round logic FIG. 2, 18.

Since an accurate normalization amount has been detected early, the result of the floating-point addition/subtraction will be available to the other elements of the center processor shortly. The low precision adder 34 sends a signal 82 to a multiplexer 85 to notify it to select data from the fast, short normalization path 80 and to inform the next processing element that the floating point operation will be completed shortly 82.

The pre-round logic 18 receives the normalization amount from the priority encoder 16 and then pre-normalizes the one, known as the round bit, which is to be added to the guard bits 22 at the LSB-1 location of the result, to determine if there will be a carry-in 60 at the 64-bit addition stage 58. For example, if the normalization amount is two then the pre-normalized one to be added to the LSB-1 will have a value of /001, since it is shifted two bit locations to the right (this assumes the one, the round bit, is represented as /1 prior to being shifted.) With this pre-normalized round bit, the round bit can be added to the lower order guard bits 22 prior to the normalization of the result. Adding the round bit at this early stage will accomplish the same result as waiting until the 64-bit floating-point result of the addition/subtraction 58 is normalized 70 and then adding the round bit to the least significant bit minus one (LSB-1) location of the normalized result 71.

The pre-round logic 18 begins operating once the guard bits 22 become available. The pre-round logic 18 has available to it the guard bits 22 associated with the aligned floating point number 55, which is in essence the bits shifted to the right during the alignment. Out of the guard bits 22 available to the pre-round logic 18, the pre-round logic 18 only utilizes the two most significant bits of the guard bits and the additional lower-order bits are fed through OR gate logic wherein the result from that logic operation becomes the third bit, the sticky bit, used by the pre-round logic 18. (In essence, the sticky bit is the OR of the other bits shifted off the 64-bit number beyond the two most significant bits.) The pre-normalized round bit is then added to the guard bits 22 to determine if there will be a carry-in 60 at the 64-bit addition stage 58.

Upon completion of the full addition of the 64-bit numbers 55, 54, the 64-bit floating-point result is normalized 72. The result of the addition of the guard bits 22 and the pre-normalized round bit is transmitted 88 to the short fast normalization 72 to be shifted into the lower bit locations of the 64-bit result in accordance with the necessary normalization. Since the round bit had been added in at the pre-round logic stage 18, upon normalization 72, the result is complete and can be quickly transmitted to the element of the processor waiting for the result.

A brief example will easily explain the operation of this invention. Assume the addition of the numbers 0.10110101XXX . . . 101×2$^2$ and 0.00010101XXX . . . 000×2$^4$, stored in registers 55 and 54, respectively. Since we are dealing with an addition, the exponents must be equal before the operation can be performed. The subtraction of the exponents of these numbers indicates that the smaller exponent (2$^2$), associated with 0.10110101XXX . . . 101, will have to be increased by two and the mantissa will have to be shifted to the right by two to compensate for the increase in the exponent. Consequently, the new aligned 64-bit number is represented by 0.0010110101XXX . . . 1/01×2$^4$, where the least significant bits 01, which were shifted out of the register, are retained as the guard bits 22.

The eight most significant bits of the aligned and unaligned numbers, to be operated upon by the low precision adder 34, are located in registers 51 and 52, respectively, and were shifted into these locations and aligned prior to the 64-bit alignment. The eight most significant bits, 0.00101101 and 0.00010101 are then added together by the two 8-bit adders FIG. 3, 57, 67, of the low precision adder 34, wherein one adder 57 adds a carry to the LSB during the addition process and the other does not 67.

The result of the two additions is 0.01000010, without a carry and 0.01000011 with a carry. These results are then sent to their respective priority encoders 26, 16 where the normalization amount for the two results is calculated. The comparator 46 compares the normalization result for both numbers. In this case the value is one for both numbers which indicates the low precision adder 34 was successful. The priority encoder 16 then sends the normalization amount to the pre-round logic FIG. 2, 18 and the comparator FIG. 3, 46 sends a signal FIG. 2, 82 to the multiplexer 85 to indicate that the result will be from the short, fast normalization cycle 72.

The pre-round logic 18 uses the normalization amount to pre-normalize the round bit so that the round bit can be added to the guard bits 22 before the 64-bit normalization. Consequently, a normalization amount of one means the one (/1) to be added to the LSB-1 location of the result, the round bit, is shifted to the right by one to become /01. This pre-normalized one is then added to the guard bits 22 (a) /010—assume a 0 sticky bit—(the slash is used merely to designate bit places) which have been saved after the 64-bit alignment. The result of the addition of the guard bits to the pre-normalized round is (a) /100. As is apparent, the addition of the guard bits 22 to the pre-normalized round bit did not result in a carry to the next significant bit place (a). Therefore, there will be no carry to the 64-bit adder 58. The result of this addition of the guard bits 22 to the pre-normalized round bit, within the pre-round logic 18, is saved to replace any bits shifted to the left when the 64-bit number is normalized.

After the 64-bit addition, since the normalization amount is known, the 64-bit result, 0.01000010XXXXX . . . / 100×2$^4$, can be normalized by one. The shift of the result one place to the left to normalize creates the number 0.1000010XXXX . . . 1/00×2$^3$, as the normalized result of the 64-bit addition (the exponent is decreased by one to compensate for the left-ward shift of the mantissa by one). The one in the LSB location is the most significant bit from the addition of the guard bits to the pre-normalized round, which occurred at the pre-round stage 18 and is sent 88 to the normalization cycle 72. It is shifted into that place to compensate for the bit which had been shifted to the left during normalization.

Now the result 0.1000010XXX . . . 1×2$^3$ can be transmitted to the element of the processor waiting for the result and the addition of a round bit after normalization has been avoided.

In the situation where the low precision adder 34 is unable to accurately pre-determine the normalization amount, because the results of the two priority encoders FIG. 3, 16, 26, associated with the two eight bit adders 57, 67 were different, the true normalization will have to be detected after the full 64-bit addition/subtraction. To indicate this, the comparator 46 sends a signal FIG. 2, 82 to the multiplexer 85 to notify it to select the data from the full 64-bit normalization 70 and the priority encoder FIG. 3, 16 disables the pre-round logic FIG. 2, 18 so the full-adder will proceed to add the two floating-point numbers in the manner currently done in the prior art.

In the full 64-bit normalization detection logic of the prior art, the priority encoder 28 determines the normalization amount, the normalization then occurs 70 and round bit is added to the normalized result 71. No time has been wasted, in implementing the low precision addition 34 first, because since the low precision adder 34 is only operating on eight bits, the addition cycle and testing stage associated with the low precision adder 34 is completed very rapidly. In essence, it is completed before the 64-bit alignment is finished. Consequently, the multiplexer 85 already knows from which data path 80 or 81 the result will be coming, and the pre-round logic 18 is disabled when a full 64-bit normalization calculation will be required.

One skilled in the art will clearly see that although the disclosure is directed towards the addition of two positive 64-bit floating-point numbers, this invention can be utilized with bits of any length, provided that some set of the most significant bits of the two numbers are used by the low-precision adder to approximate the normalization amount. Moreover, this invention can be extended to subtraction as well as conducting operations on floating-point numbers with different signs.

What is claimed is:

1. An arithmetic logic device, which comprises:
   (a) a first addition and subtraction device operating to perform a first arithmetic function on operands to obtain a first result;
   (b) a second addition and subtraction device operating to perform a second arithmetic function on the n-most significant bits of each of said operands to obtain a second result; and
   (c) an evaluation circuit coupled to the second addition and subtraction device to evaluate the second result in respect of a first predetermined condition to determine a normalization amount for the first result of said first addition and subtraction device when the first predetermined condition is detected;
   (d) the evaluation circuit being coupled to the first addition and subtraction device to input the normalization amount.

2. An arithmetic logic device according to claim 1, further comprising an aligner connected to said first and second addition and subtraction devices for aligning the operands to thereby create guard bits.

3. An arithmetic logic device according to claim 2, wherein the first addition and subtraction device comprises an m-bit adder and a pre-round logic circuit connected to said m-bit adder.

4. An arithmetic logic device according to claim 3, wherein the pre-round logic circuit includes means for receiving the normalization amount from said evaluation circuit to shift a round bit in accordance with the normalization amount, means for adding the shifted round bit to said guard bits, and means for adding a carry-in bit into said m-bit adder, upon a second predetermined condition being satisfied.

5. An arithmetic logic device according to claim 4, further comprising a multiplexer with inputs connected to an output of said m-bit adder and an output of said pre-round logic circuit, and a select line connected to said evaluation circuit for carrying signals to control said multiplexer in accordance with the first predetermined condition.

6. An arithmetic logic device according to claim 5 further comprising first and second parallel paths between said first addition and subtraction device and said multiplexer, wherein said first path includes: a priority encoder for determining the normalization amount; a normalization shifter for shifting an m-bit result of the m-bit adder in accordance with the normalization amount to produce a normalized result; and a further m-bit adder for adding said round bit to said normalized result; and wherein said second path includes a fast normalization shifter for shifting the m-bit result of the m-bit adder in accordance with the normalization amount from said evaluation circuit and the output of said pre-round logic circuit.

7. An arithmetic logic device according to claim 6, wherein said second addition and subtraction device includes a pair of parallel n-bit adders separately connected to said evaluation circuit, for respectively producing a sum and a sum plus a carry of said n-most significant bits.

8. An arithmetic logic device according to claim 7, wherein said evaluation circuit includes: a pair of priority encoders connected to said n-bit adders to respectively receive said sum and said sum plus a carry, each said priority encoder outputting an evaluation normalization amount; and a comparator for receiving and comparing said evaluation normalization amounts and outputting said signal to said multiplexer when said evaluation normalization amounts match.

9. An arithmetic logic device according to claim 8, wherein said first predetermined condition is the result of matching said evaluation normalization amounts.

10. An arithmetic logic device according to claim 9, wherein said second predetermined condition is a production of a carry-in bit when the shifted round bit is added to the guard bits.

11. A method of operating a processor to perform floating point arithmetic operations on two floating point m-bit operands, the method comprising the steps of:
(a) determining an alignment amount by which a first of said floating point m-bit operands must shift its lower ordered bits to align with a second of said floating point m-bit operands using an exponent subtractor;
(b) storing in a first register an unaligned n-most significant bit slice from said second of said floating point m-bit operands;
(c) producing an aligned n-most significant bit slice from said first of said floating point m-bit operands, in accordance with the alignment amount determined by the exponent subtractor, for storage in a second register;
(d) aligning the first of the floating point m-bit operands and the second of the floating point m-bit operands in accordance with the alignment amount determined by the exponent subtractor;
(e) storing in a third register as guard bits the lower ordered bits of said first of said floating point m-bit operands that were shifted by the alignment amount as a result of the alignment;
(f) adding in two separate n-bit adders the aligned and unaligned n-most significant bit slices to produce a first and second sum, one of said n-bit adders receiving a carry bit;
(g) calculating a first and second normalization amount from the first and second sums using a first and second priority encoder, respectively;
(h) comparing in a comparator whether the first and second normalization amounts are equal, and when said first and second normalization amounts are equal:
(i) calculating in a pre-round logic circuit a shifted round bit in accordance with one of the first and second normalization amounts, adding the shifted round bit to the guard bits to determine a first result and whether a carry bit is generated wherein said carry bit would be input to an m-bit adder, said m-bit adder adding the first and second of said floating point m-bit operands to produce a second result;
(ii) shifting the second result in accordance with one of the first and second normalization amounts to produce a normalized result;
(iii) shifting the first result into the lower ordered bits of the normalized result in accordance with one of the first and second normalization amounts.

* * * * *